May 21, 1968     E. RÖNTGEN     3,384,298

VALVE ASSEMBLY FOR RECIPROCATING COMPRESSORS

Filed July 1, 1966     2 Sheets-Sheet 1

Inventor
Erwin Röntgen
By
Watson, Cole, Grindle & Watson
Attys.

Inventor
Erwin Röntgen
By
Watson, Cole, Grindle & Watson
Attys.

United States Patent Office 3,384,298
Patented May 21, 1968

3,384,298
VALVE ASSEMBLY FOR RECIPROCATING
COMPRESSORS
Erwin Röntgen, Schongau (Lech), Upper Bavaria, Germany, assignor to Hoerbiger Ventilwerke, Aktiengesellschaft, Vienna, Austria
Filed July 1, 1966, Ser. No. 562,258
Claims priority, application Austria, July 2, 1965,
A 6,008/65
6 Claims. (Cl. 230—231)

ABSTRACT OF THE DISCLOSURE

A valve assembly for compressors having a valve seat plate located between a cylinder and a cylinder head of a compressor and provided with suction and discharge ports of which the control of the discharge ports includes a valve lamina on the upper side of the valve seat plate and a further valve lamina on the under side of the valve seat plate for control of the suction ports.

The invention relates to a valve assembly for reciprocating compressors, comprising a valve seat plate located between the cylinder and the cylinder head of the compressor and provided with suction and discharge ports, which are controlled by valve laminae attached to the valve seat plate. Similar valve assemblies comprising so-called lamellar valves are generally used for small-sized compressors, in particular for compression-type refrigerating apparatus and brake compressors of automotive vehicles. They distinguish themselves by their plain construction and reduce the clearance volume of the compressor considerably.

In most conventional valve assemblies of this type the closing members consist of approximately rectangular resilient tongues or laminae. The suction valve lamina is clamped with its one extremity between the cylinder and the valve seat plate and controls with its other extremity the suction ports provided in the valve seat plate in the vicinity of the point of the cylinder which is diametrically opposite the clamping point. As a result, the suction valve lamina is of a length about equal to the diameter of the cylinder and permits of large valve strokes with comparatively minor bending stresses. However, this design is not suitable for the increasingly popular type of reciprocating compressors featuring high speeds and large cylinder diameters with short piston strokes, particularly in view of the resulting considerable overall length of the suction valve laminae calling for greater thickness of the laminae which increases the mass thereof to a degree which precludes its use for high speeds.

According to another conventional design the laminae are of annular shape with fastening lugs provided inside the annular portion and connected with the said annular portion on their side facing away from the ports to be controlled. However, the relatively long resilient stripes thus produced between the fastening lugs and the portion of the lamina controlling the ports in the valve seat plate are also unsuitable for high-speed compressors. Another drawback of this design resides in the fact that with this arrangement of the fastening lugs of the annular portion it is impossible to clamp the lamina between the valve seat plate and the cylinder or cylinder head and only minor recesses remain within the annular portion for the passage of the flow medium.

It is the object of the invention to improve upon the said valve assemblies of conventional design by providing a valve assembly of the type described which is particularly suitable for high-speed compressors featuring a major stroke volume owing to particular shape and suspension of the suction valve lamina.

The invention consists in a valve assembly for reciprocating compressors, comprising a valve seat plate located between the cylinder and the cylinder head of the compressor and provided with suction and discharge ports, a discharge valve lamina on the upper side of the valve seat plate for the control of the discharge ports and a suction valve lamina on the underside of the valve seat plate for the control of the suction ports, the suction valve lamina being of an approximately annular shape and attached to the valve seat plate at two points of its periphery spaced from each other in a circumferential direction, the straight line interconnecting the two points of attachment extending through the periphery of the cylinder bore as viewed from above. For the purpose of securing the suction valve lamina to the valve seat plate, according to the invention protruding lugs may be provided on the periphery of the annular suction valve lamina.

Owing to the lateral suspension of the suction valve lamina the resilient portion of the same can be of the required shortness so as to reduce the oscillating mass accordingly, the natural frequency of oscillation of the suction valve lamina being sufficiently above the level of the operational frequency even with higher compressor speeds. The distance between the two points of attachment themselves and between them and the oscillating portion of the lamina controlling the suction ports may be varied in accordance with the size of the cylinder to meet certain operational requirements, particularly with regard to speed. Moreover, the location of the points of attachment on the periphery of the suction valve lamina makes it possible for the said lamina to be clamped between the cylinder and the valve seat plate, a recess of adequate size for the passage of the flow medium, and in particular, also for the arrangement of the discharge ports, being provided in the middle of the suction valve lamina.

Preferably the suction valve lamina is bolted to the valve seat plate jointly with the discharge valve lamina by means of the same bolts. This arrangement is possible as a result of the location of the points of attachment in spaced relation to each other in the circumferential direction of the suction valve lamina and offers the advantage of dispensing with a separate fastening or guide means for the suction valve lamina, thus considerably reducing the cost of manufacturing the valve assembly. Moreover, this design provides greater accuracy of the position of the laminae in relation to the ports in the valve seat plate.

The two points of attachment may be located on the periphery of the annular suction valve lamina approximately diametrically opposite each other, the suction valve lamina controlling suction ports provided in the valve seat plate on both sides of the straight line interconnecting the said points of attachment. This design ensures an adequate passage cross-section of the suction valve in short-stroke valve assemblies particularly suitable for use in high-speed compressors.

The suction valve lamina according to the invention is preferably of an essentially circular design resulting in relatively low tensions in the cross-sections of the lamina subject to bending stresses and consequently, in a long life of the lamina. The circular suction valve lamina is located within the periphery of the cylinder bore and protrudes from the said periphery at the points of attachment only with lugs clamped between the cylinder and the valve seat plate, and occasionally, with noses limiting the lift of the suction valve lamina. Furthermore, the outside diameter of the circular suction valve lamina is preferably only slightly smaller than the diameter of the cylinder bore, as this design not only reduces the strain on the material during the operation of the valve, but also the clearance volume of the compressor, since the clearance necessarily left between the piston head and the underside of the valve seat plate for the working of the lamina is adequately filled. If necessary, the compressor piston can be designed with a stepped-down piston head filling also the central depression in the suction valve lamina.

The features and advantages of the invention will be apparent from the following description and the accompanying drawings, in which.

Figure 1:
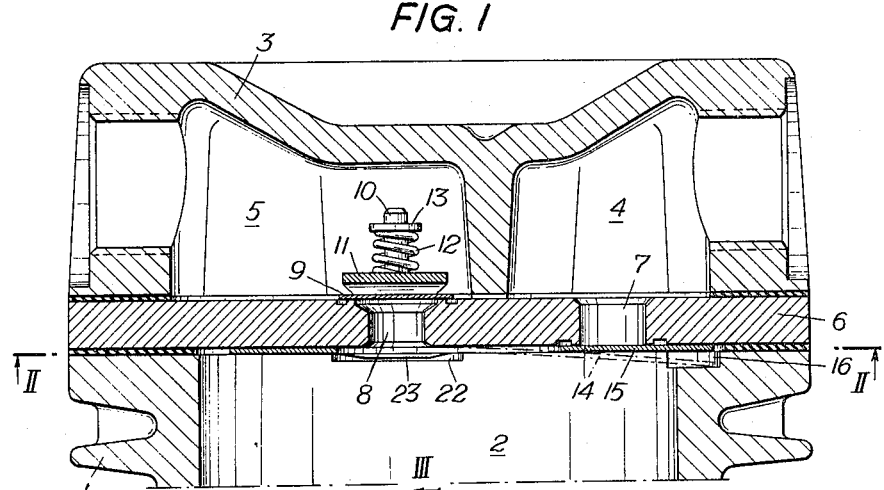
FIG. 1 shows the upper portion of a compressor equipped with a valve assembly according to the invention on the line marked I—I in FIG. 2.

The compressor shown in FIG. 1 comprises a cylinder 1 with the cylinder bore 2 and a cylinder head 3 provided with a suction chamber 4 and a pressure chamber 5. Clamped between the cylinder 1 and the cylinder head 3 is a valve seat plate 6 presenting suction ports 7 and discharge ports 8. Located on the upper side of the valve seat plate 6 is a discharge valve lamina 9 controlling the discharge ports 8 and guided by means of bolts 10 with a clearance assuring its mobility and pressed against the valve seat plate 6 together with a slightly curved valve guard plate 11 by means of helical springs 12 resting on the bolts 10 and supported by discs 13 placed upon the bolts 10. Anchored to the underside of the valve seat plate 6 is a suction valve lamina 14 controlling the suction ports 7. The said suction valve lamina is not provided with a separate valve guard but merely protrudes with a nose 15 into a recess 16 provided in the cylinder 1. As indicated by a dot-dash line in FIG. 1, the said nose serves as a stop for the valve lift.

Figure 2:
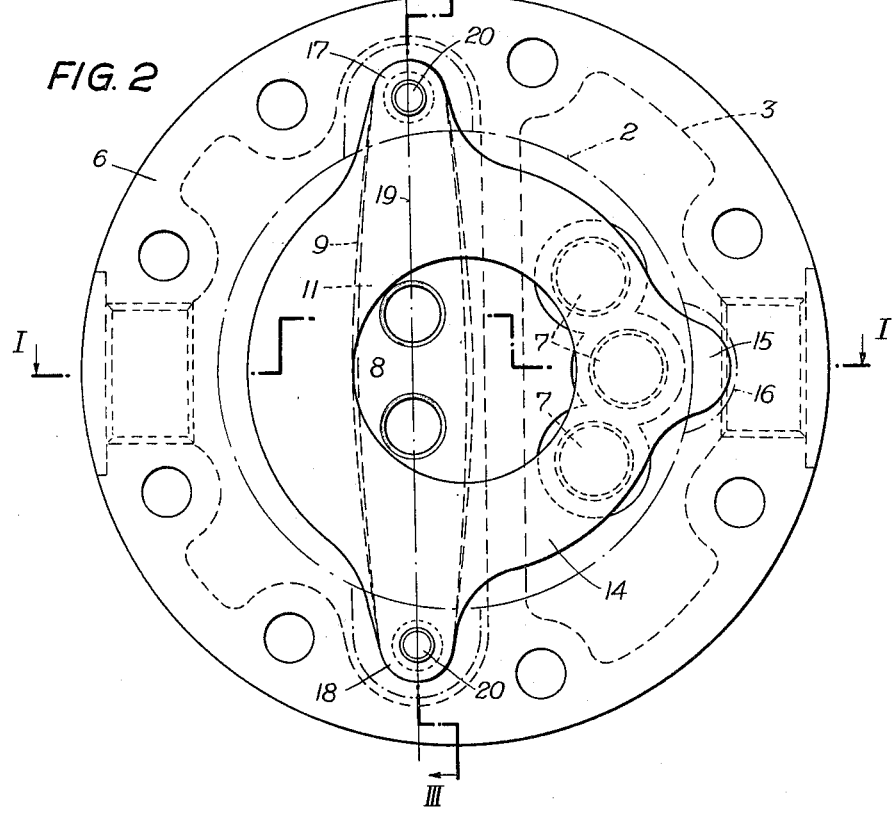
FIG. 2 shows a view of the side of the valve assembly facing the cylinder on the line marked II—II in FIG. 1.

The shape of the suction valve lamina 14 and its attachment of the valve plate 6 is illustrated in FIG. 2. The suction valve lamina 14 is of an essentially annular shape and comprises in addition to the nose 15 on its periphery two protruding lugs 17 and 18 located in a circumferential direction in spaced relation to each other and extending beyond the periphery of the cylinder bore 2 indicated by a dot-dash line in FIG. 2. The lugs 17 and 18 are clamped between the cylinder 1 and the valve seat plate 6, the straight line 19 interconnecting the two fastening lugs 17 and 18 and indicated by a dot-dash line extending through the periphery of the cylinder bore 2. The suction valve lamina 14 is thus clamped in two places in spaced relation to each other, the resilient section of the said lamina being relatively short so as to provide for a correspondingly small oscillating mass and high natural frequency of the suction valve lamina 14, which is consequently, suitable for high-speed compressors with even major piston diameters. By modifying the distance between the fastening lugs 17, 18 and the suction ports 7 controlled by the suction valve lamina 14 the resilience and oscillating properties of the suction valve lamina 14 can be readily adapted to prevailing conditions of operation.

The suction valve lamina 14 can be clamped and secured in a manner known per se, preferably by means of guide pins or the like extending through the fastening lugs 17 and 18 and determining the correct position of the suction valve lamina 14 within the compressor. The embodiment shown illustrates another clamping method, which is particularly convenient and whereby the suction valve lamina 14 is secured to the valve seat plate jointly with the discharge valve lamina 9 by means of the same bolts 10. As appears from FIG. 3, the bolts 10 extend through the valve seat plate 6 with a cylindrical head 20 provided at each extremity facing the cylinder 1, the said head protruding into a recess 21 in the cylinder 1. The suction valve lamina 14 is placed in position on the valve seat plate 6 from below, the cylindrical heads 20 of the two bolts 10 engaging in bores of the fastening lugs 17, 18. The lugs 17, 18 are located in flat, semi-circular depressions 22 provided in the end surface of the cylinder 1, being preferably clamped together with the underlying gasket 23 interposed between the cylinder 1 and the valve seat plate 6. However, the suction valve lamina 14 can also be clamped by means of a curved spring leaf insert. The joint attachment of both the discharge valve lamina 9 and the suction valve lamina 14 by means of the two bolts 10 makes it possible to dispense with special guide pins for the suction valve lamina. The depressions 24 in the valve seat plate 6 below the discharge valve lamina 9 shown in FIG. 3 preclude objectionable sticking of the discharge valve lamina 9 to the seat plate.

As appears likewise from FIG. 2, the annular suction valve lamina 14 is located with its annular section entirely within the periphery of the cylinder bore 2, its outside diameter being only slightly smaller than the diameter of the cylinder bore 2. Thus the clearance between the piston head and the valve seat plate 6 which is necessary for the mobility of the suction valve lamina is adequately filled, thereby reducing the clearance volume of the compressor. The circular recess provided in the centre of the suction valve lamina 14 serves for the passage of the flow medium to the discharge ports 8 in the valve seat plate 6.

Figure 3:
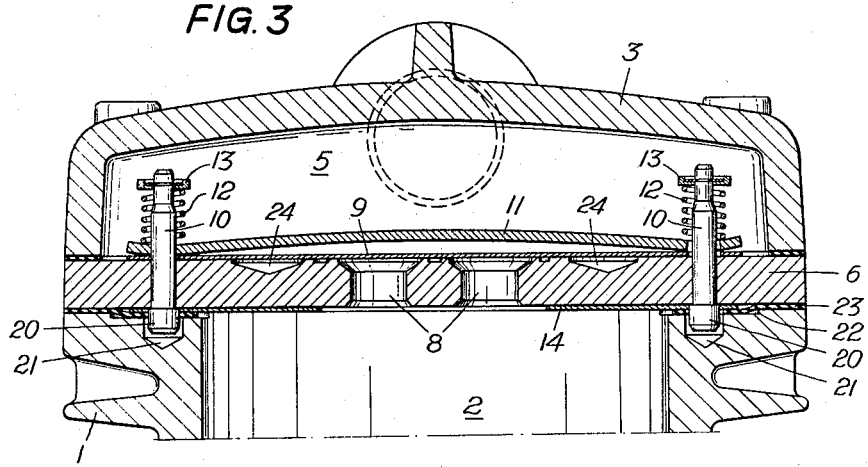
FIG. 3 shows a sectional view on the line marked III—III in FIG. 2.
Figure 4:
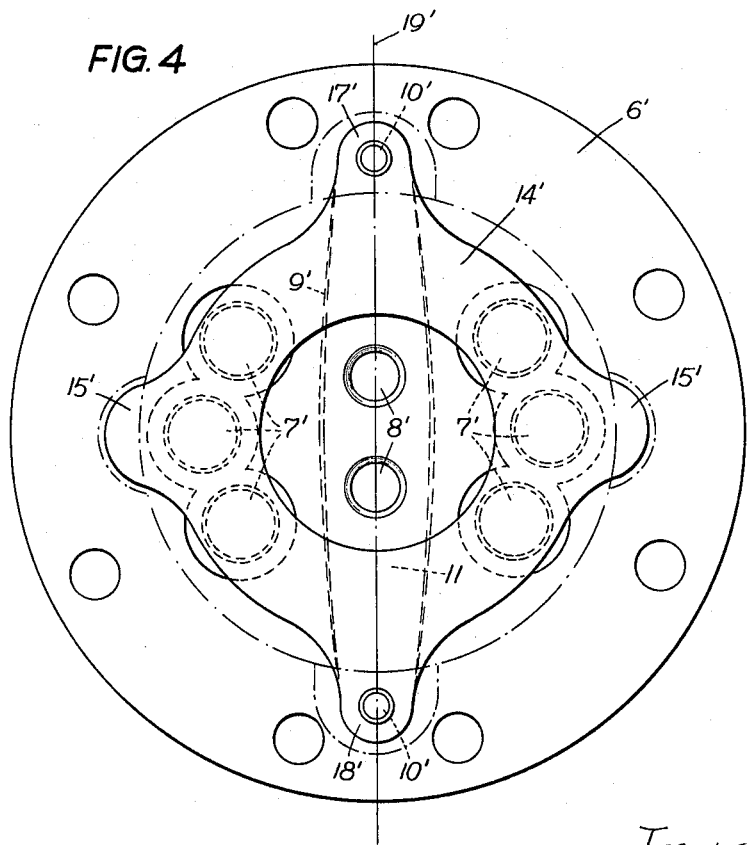
FIG. 4 shows a view of the side of another variant of the valve assembly according to the invention facing the cylinder.

The variant of the valve assembly according to the invention shown in FIG. 4 differs from the embodiment of the invention illustrated in FIGS. 1 to 3 merely in the slightly different shape of the suction valve lamina 14'. The points of attachment 17', 18' are located diametrically opposite each other on the periphery of the annular suction valve lamina 14', the straight line 19' interconnecting the two points extending through the cylinder axis. This arrangement provides a symmetrical design of the suction valve lamina 14', in relation to the straight line 19', the said suction valve lamina thus controlling suction ports 7' provided on both sides in the valve seat plate 6'. For the purpose of limiting the lift of the two flexible halves of the suction valve lamina 14', each half is equipped with a protruding nose 15'. Again the suction valve lamina 14' together with the discharge valve lamina 9' indicated by a dotted line is secured to the valve seat plate 6' by means of the same bolts 10', the discharge ports 8' being encompassed by the annular suction valve lamina 14'.

This embodiment of the invention is particularly suitable for reciprocating compressors with major cylinder diameters and offers the advantage of controlling a larger number of suction ports 7' by means of the same suction valve lamina 14', as a result of which the available passage cross-section is comparatively large even when the lift of the suction valve lamina 14' is small. Owing to the arrangement of the suction valve lamina 14' in the compressor in symmetrical relation to the cylinder axis it is also possible to arrange the discharge ports 8' on a diameter of the circular recess in the centre of the suction valve lamina 14', so as to make the largest possible cross-section available for them also. Whereas in the embodiment of the invention shown in FIG. 2 the central circular recess of the suction valve lamina 14 is slightly eccentrical, in the embodiment of the invention illustrated in FIG. 4 it is preferably concentrical in relation to the periphery of the suction valve lamina 14'. Likewise, the suction and the pressure chamber in the cylinder head are designed in concentrical relation to each other in this embodiment of the invention.

A number of variants of the embodiments of the invention shown in the accompanying drawings are feasible without exceeding the scope of the present invention. For example, the design of the suction valve lamina may differ from the circular shape shown in the drawings and present the rectangular cross-section common to conventional suction valve laminae, with the essential difference that in that case too, two lugs must be provided for the attachment to the valve seat plate and guidance of the suction valve lamina, the said lugs being located on the periphery of the suction valve lamina and at a considerable distance from each other, so that the straight line interconnecting the two points of attachment extends through the periphery of the cylinder bore as a secant as viewed from above. Consequently, the suction valve lamina according to the invention is not secured to the valve seat plate at a point diametrically opposite the suction ports in relation to the cylinder bore, but rather in two places closer to the suction ports in a peripheral direction of the cylinder bore.

I claim:

1. A valve assembly for reciprocating compressors, comprising a valve seat plate located between a cylinder and a cylinder head of the compressor and provided with suction and discharge ports, a discharge valve lamina on the upper side of the valve seat plate for the control of the discharge ports, and a suction valve lamina on the underside of the valve seat plate for the control of the suction ports, the suction valve lamina being of an approximately annular shape and having protruding lugs provided on the periphery of the annular suction valve lamina in two places located in spaced relation to each other in the direction of its periphery, the suction valve lamina being attached to the valve seat plate, and a straight line interconnecting the two points of attachment extending through the periphery of a cylinder bore as viewed from above.

2. A valve assembly as claimed in claim 1, comprising bolts for the attachment of the discharge valve lamina and of the suction valve lamina to the valve seat plate, the suction valve lamina being secured jointly with the discharge valve lamina to the valve seat plate by means of the same bolts.

3. A valve assembly as claimed in claim 1, wherein the two points of attachment are located on the periphery of the annular suction valve lamina approximately diametrically opposite each other, suction ports being provided in the valve seat plate on both sides of the straight line interconnecting the said points of attachment, the suction ports being controlled by the said annular suction valve lamina.

4. A valve assembly as claimed in claim 1, wherein the suction valve lamina is of an essentially circular design.

5. A valve assembly as claimed in claim 4, wherein the circular suction valve lamina is located within the periphery of the cylinder bore, protruding from the circumference to the cylinder bore only at the points of attachment with lugs clamped between the cylinder and the valve seat plate, and also with noses limiting the lift of the suction valve lamina.

6. A valve assembly as claimed in claim 4, wherein the outside diameter of the circular suction valve lamina is slightly smaller than the diameter of the cylinder bore.

References Cited

UNITED STATES PATENTS

| | | | |
|---|---|---|---|
| 2,846,140 | 8/1958 | Kemper | 230—231 XR |
| 2,883,100 | 4/1959 | Harter | 230—231 XR |
| 3,010,644 | 11/1961 | Zeidler | 230—231 XR |

ROBERT M. WALKER, *Primary Examiner.*